(12) United States Patent
Jalbert et al.

(10) Patent No.: US 8,215,359 B2
(45) Date of Patent: Jul. 10, 2012

(54) PART SENSING HORN

(75) Inventors: Robert D. Jalbert, Mountain Top, PA (US); John J. Ablamsky, Jr., Waterbury, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 645 days.

(21) Appl. No.: 12/398,521

(22) Filed: Mar. 5, 2009

(65) Prior Publication Data
US 2010/0224327 A1    Sep. 9, 2010

(51) Int. Cl.
*B32B 37/00* (2006.01)
(52) U.S. Cl. ...................... 156/378; 156/580.1

(58) Field of Classification Search .................. 156/64, 156/73.1, 367, 368, 378, 580.1, 580.2; 264/442, 264/443, 444, 445; 425/174.2; 228/110.1, 228/1.1
See application file for complete search history.

(56) References Cited

U.S. PATENT DOCUMENTS
5,772,814 A * 6/1998 Grewell ......................... 156/64
2005/0238819 A1* 10/2005 Beretitsch et al. ............ 427/600
* cited by examiner

*Primary Examiner* — James Sells
(74) *Attorney, Agent, or Firm* — Harness, Dickey & Pierce, P.L.C.

(57) ABSTRACT

A nodal sensing horn assembly for use in ultrasonic welding a first part to a second part that includes a nodal horn, a cavity formed within the nodal horn, and a sensing device at least partially disposed within the cavity. The sensing device senses a property, such as presence and/or orientation, of the first part and outputs a sensing signal in response thereto.

13 Claims, 2 Drawing Sheets

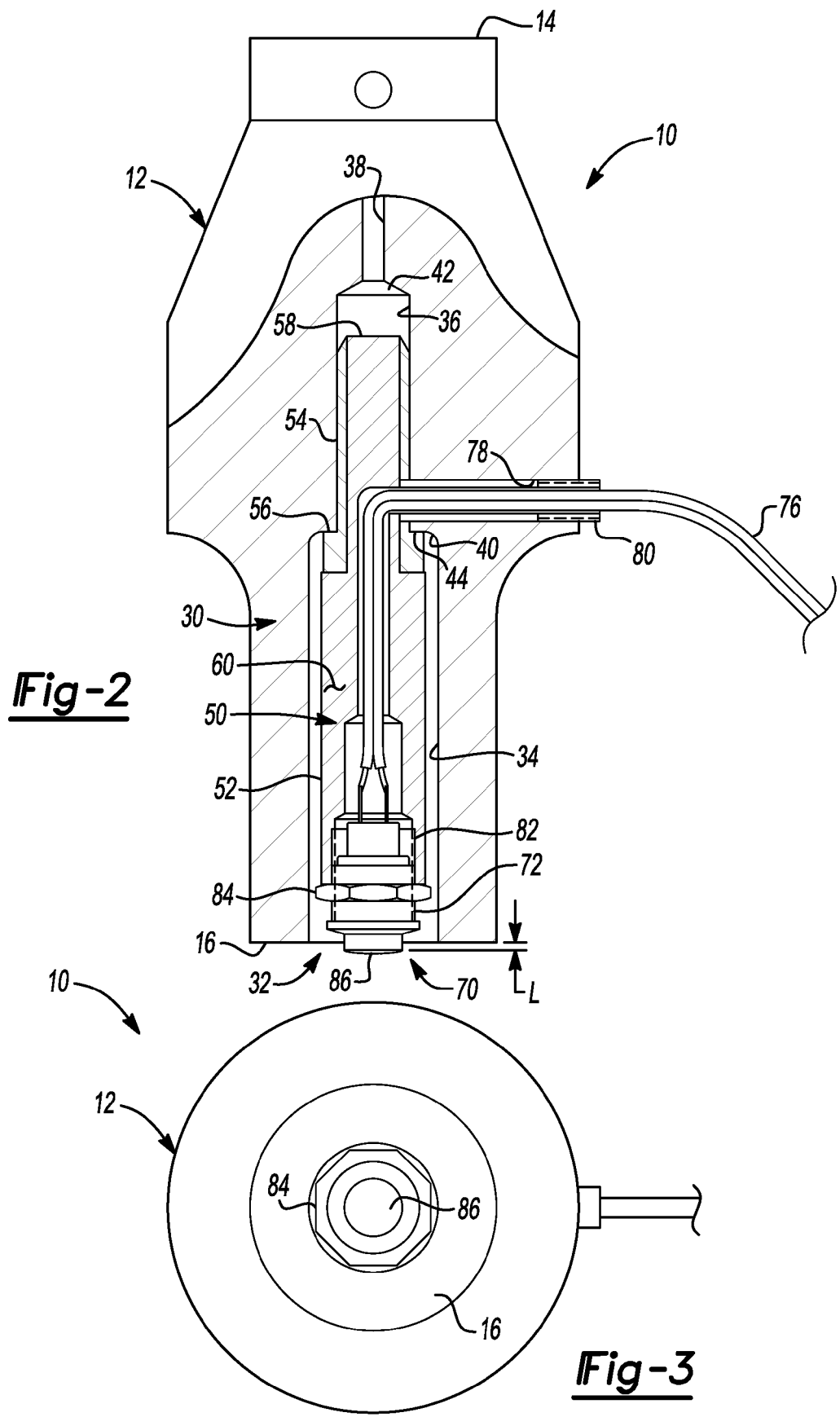

PART SENSING HORN

FIELD

The present disclosure relates to ultrasonic welding horns and, more particularly, relates to a part sensing welding horn.

BACKGROUND

This section provides background information related to the present disclosure which is not necessarily prior art.

Ultrasonic energy has been shown to be a useful tool in a wide variety of applications from very low power medical diagnostics through high intensity processes which change the state of materials. Joining of plastics, specifically thermo plastics, is a particularly useful application of this technology. Ultrasonic welding of thermoplastics has been demonstrated to eliminate most, if not all, of these problems. In fact, ultrasonic welding of plastics has become the process of choice by informed design and manufacturing engineers. The number of applications and reduced operating expenses have led to wide use of ultrasonic welding for thermoplastic applications.

Since the first ultrasonic welding machine for plastics was developed in 1960, there have been significant technological advances which now make the process a practical production tool. Early power supplies, employing vacuum tube technology, could not produce high power levels of ultrasonic energy and were inefficient and expensive. Early work was limited to research and development which showed the promise of the process and spurred further technical development. Today, ultrasonic energy in general is a well established tool of industry having applications in nondestructive testing, industrial ultrasonic cleaning, ultrasonic plastic joining and ultrasonic metal welding. Ultrasonic plastic welding has much to offer the user including speed, efficiency, excellent weld quality, elimination of consumables, long tool life and the ability to be automated.

Generally, ultrasonic energy is mechanical vibratory energy which operates at frequencies beyond audible sound, or 18,000 Hz (18,000 Hz being the upper threshold of the normal human hearing range). Four basic frequencies are generally used; 15,000 Hz, 20,000 Hz, 30,000 Hz, and 40,000 Hz, depending on the application. Selection is based upon the required power levels, the amplitude of vibration required and the size of the ultrasonic tool to be used. Frequency is important because it directly affects the power and amplitude available and the tool size. It is easier to generate and control high power levels at the lower frequency. Also, ultrasonic tools are resonant members whose size is inversely proportional to their operating frequency. The generation of ultrasonic energy starts with conversion of conventional 50 or 60 Hz electrical power to 15,000, 20,000, 30,000 or 40,000 Hz electrical energy by a solid state power supply.

Ultrasonic welding can be used in a wide variety of applications, including in connection with parts made from a number of materials and sizes. Moreover, such ultrasonic welding can be used in conjunction with a wide variety of automation. Currently, there is a growing desire to further automate the ultrasonic welding process and to this end attempts have been made to use complex imaging systems to detect the presence of a part to be welded. These imaging systems may include optical detectors and processing equipment to visually confirm a welding arrangement. As such, the imaging system is typically mounted to at an angle relative to the longitudinal axis of an ultrasonic welding horn. In this manner, the imaging system can detect the desired part and provide feedback for processing.

However, as the parts to be welded become larger, the size of the ultrasonic welding horn become larger, or the available space become more limited, the use of an off-axis detecting system may not provide sufficient operational benefits. Moreover, the complexity and cost of such imaging systems may be disadvantageous for most application. Still further, such imaging systems often fail to provide reliable operation and function. Accordingly, there exists a need in the relevant art to provide a simplified sensor system for use in ultrasonic welding applications.

SUMMARY

This section provides a general summary of the disclosure, and is not a comprehensive disclosure of its full scope or all of its features.

According to the principles of the present teachings, a nodal sensing horn assembly for use in ultrasonic welding a first part to a second part is provided having advantageous construction. The nodal sensing horn comprises a nodal horn, a cavity formed within the nodal horn, and a sensing device at least partially disposed within the cavity. The sensing device senses a property, such as presence and/or orientation, of the first part and outputs a sensing signal in response thereto.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a cross-sectional view of the nodal sensing horn assembly of the present teachings; and FIG. 3 is an end view of the nodal sensing horn assembly.

Corresponding reference numerals indicate corresponding parts throughout the several views of the drawings.

DETAILED DESCRIPTION

Figure 1:
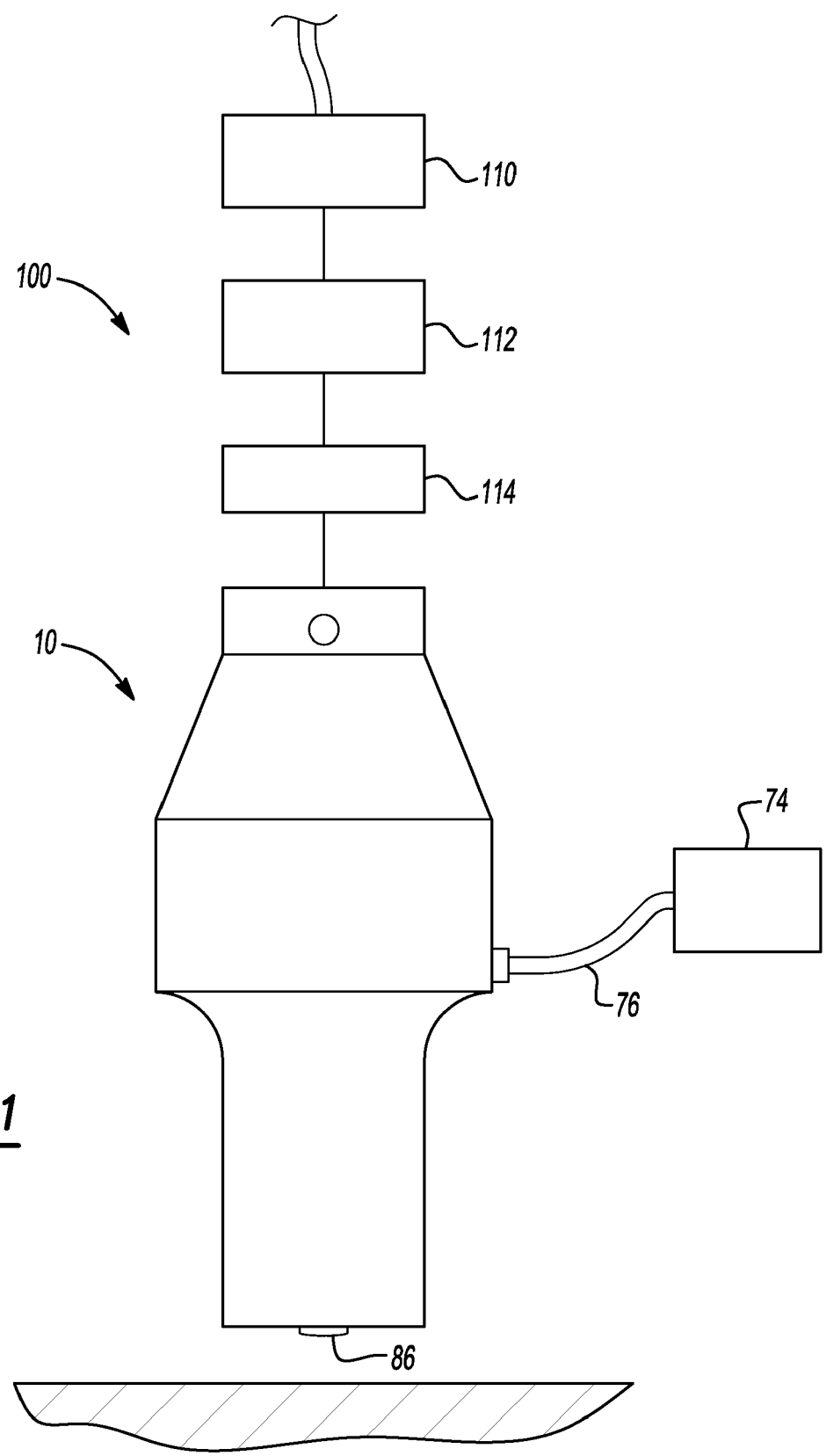
FIG. 1 is a schematic view of an ultrasonic welder having a nodal sensing horn assembly according to the principles of the present teachings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper", "proximal", "distal", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to the figures and in FIG. 1 in particular, there is schematically shown an ultrasonic half-wavelength resonator 100 having a means for energizing the resonator, such as an electrical generator 110. A half wavelength resonator is characterized by an antinodal region of longitudinal motion at both the input surface and the output surface and an intermediate nodal region of longitudinal motion. An electrical generator 110 converts line voltage to a predetermined high frequency electrical signal. The predetermined frequency is usually in the range between one and 100 kilohertz, preferably in the range between 15 and 60 kilohertz. The electrical signal from electrical generator 110 is provided to an electro-acoustic converter 112 which converts the electrical energy applied at its input into mechanical vibratory motion of the predetermined frequency manifest at the output surface of the converter. Electro-acoustic converter 112 can be of conventional design, if desired. The converter can further be constructed in accordance with the teachings of U.S. Pat. No. 4,315,181, issued to Holze, Jr., dated Feb. 9, 1982, entitled "Ultrasonic Resonator (Horn) with Skewed Slots." While electro-acoustic converter 112 is preferably an electro-acoustic converter, a magnetostrictive converter could be used.

Still referring to FIG. 1, electro-acoustic converter 112 can then be operably coupled to a diaphragm 114 or booster 114, which transmits the mechanical vibratory motion from electro-acoustic converter 112 to a horn 10 via a threaded stud (not shown) for ultrasonic welding according to the principles of the present teachings. Referring to FIGS. 2-9, horn 10 is illustrated as a nodal sensing horn. The design of the nodal sensing horn of the present teachings offers operators a simple and reliable means to sense the presence of an item, such as a fabrication part, cover, or other item without the need to incorporate expensive and complex imaging systems. Moreover, as will be described, the part sensing horn assembly 10 of the present teachings defines an assembly that is reliable, safe, and useful for ultrasonic welding. In some embodiments, part sensing horn assembly 10 is made of titanium, although other materials are anticipated.

To this end, as seen in FIGS. 2 and 3, part sensing horn assembly 10 comprises a generally cylindrical nodal horn 12 terminating at a mounting face 14. Mounting face 14 comprises a conventional mounting system for operably coupling part sensing horn assembly 10 to booster 114 or converter 112 to permit transmission of mechanical vibratory energy to part sensing horn assembly 10. It should be appreciated that part sensing horn assembly 10 can having any shape desired that defines a contact face 16 for engaging a part to be welded.

As seen in FIG. 2, part sensing horn assembly 10 further comprises a sensing assembly 30 disposed within a portion of generally cylindrical nodal horn 12. Specifically, in some embodiments, part sensing horn assembly 10 is disposed within a cavity 32 formed in nodal horn 12. Cavity 32 can comprise a distal portion 34, a proximal portion 36, and a vent portion 38. A shoulder region 40 can extend between proximal portion 36 and distal portion 34. Furthermore, in some embodiments, a shoulder region 42 can extend between distal portion 34 and vent portion 38. Shoulder region 40 can include a generally flat face 44, which will be discussed in greater detail below. Although cavity 32, as described, comprises a series of cylindrical portions, it should be appreciated that other shapes, cross-sectional profiles, and mounting interfaces are anticipated, including a rectangular-shaped cross-section, an elliptical cross-section, a spline interface, a threaded interface, and the like.

Still referring to FIG. 2, in some embodiments, part sensing horn assembly 10 further comprises a sleeve member 50 received within cavity 32 of nodal horn 12. Sleeve member 50 can comprise a distal portion 52, a proximal portion 54, and a transition portion 56 extending therebetween. Depending on the shape and cross-sectional profile of cavity 32, distal portion 52, proximal portion 54, and transition portion 56 can be sized and shaped to mate with cavity 32 in a predetermined configuration. For example, in the illustrated embodiment, sleeve member 50 can comprise a generally cylindrically-shaped proximal portion 54 that is received within proximal portion 36 of cavity 32 in a press-fit configuration. To this end, proximal portion 54 of sleeve member 50 can define a length between transition portion 56 (in the form of a shoulder) and an end 58 thereof that is less than a length of proximal portion 36 of cavity 32. In this way, it can be ensured that transition portion 56 of sleeve member 50 can properly engage shoulder region 40 of cavity 32 to prevent inadvertent translation sleeve member 50 relative to nodal horn 12 along the nodal axis NA (see FIG. 2) without end 58 engaging shoulder region 42.

To ensure proper engagement of sleeve member 50 with nodal horn 12, in some embodiments, proximal portion 54 of sleeve member 50 is sized to be fixed retained sleeve member 50 to nodal horn 12 as discussed, however distal portion 52 of sleeve member 50 is sized to be set apart from distal portion 34 of cavity 32 such that any retaining force between sleeve member 50 and nodal horn 12 is limited to the interface between proximal portion 54 of sleeve member 50 and proximal portion 36 of cavity 32.

Still referring to FIG. 2, distal portion 52 of sleeve member 50 can define an interior volume 60 sufficiently sized to retain a sensing device 70 therein. In some embodiments, sensing device 70 comprises a switch or sensor member 72 (collectively described as switch member 72 herein) electrically coupled to a sensing controller 74 (FIG. 1) via a line 76, such as an electrical wire. It should be appreciated that, in some embodiments, sensing device 70 can comprise a wireless transmitter operably coupled to switch member 72 for wirelessly communicating with sensing controller 74. To this end, a wireless transmitter (not shown) could be operably coupled to switch member 72 and, in some embodiments, retained within nodal horn 12 or nearby and powered by a power source to output a sensing signal. Similarly, sensing controller 74 could comprise a wireless receiver for receiving the sensing signal.

In some embodiments, as illustrated in FIG. 2, line 76 can extend from switch member 72 within interior volume 60, generally along nodal axis NA, to a pass-through passage 78 formed through proximal portion 54 of sleeve member 50 and proximal portion 36 of nodal horn 12 and to sensing controller 74. To this end, in some embodiments, an insulator 80 can be used to electrically insulate line 76 from sleeve member 50 and/or nodal horn 12.

In some embodiments, switch member 72 can comprise a switch body 82 generally containing a conventional switch mechanism therein. Switch body 82 can define a threaded exterior surface (not shown) for enmeshingly engaging a retaining nut 84 or other adjustment device. Retaining nut 84 can be employed to positively position switch member 72 at a predetermined depth relative to contact face 16 of nodal horn 12. That is, retaining nut 84 can be adjusted to translate switch member 72 to a position such that an engageable portion 86 of switch member 72 extends to a distal position beyond contact face 16 when in an initial position a length L (FIG. 2), but can compress or otherwise retract to a contact position wherein engagable portion 86 of switch member 72 is protected within cavity 32 and/or interior volume 60. It should be appreciated that other coupling structures can be used to achieve the goal of providing a sensor operable to detect the presence of a part to be welded, wherein that sensor generally extends from or is part of the contact face of the nodal horn.

In some embodiments, switch member 72 can be a mechanical switch or sensor, an inductive switch or sensor, a capacitive switch or sensor, a photoelectric switch or sensor, a magnetic switch or sensor, an acoustic switch or sensor, an electromagnetic switch or sensor, or other switch or sensor. It should be appreciated that determination of which type of switch or sensor to use is dependent on, at least, the operating environment and the part to be sensed. It should also be appreciated that various combinations of switches and sensors can be used.

In operation, part sensing horn assembly 10 can be used to ultrasonically weld a first part to a second part according to known ultrasonic techniques. To this end, part sensing horn assembly 10 can be positioned above or generally adjacent a part to be weld. Nodal horn 12 can then be moved using a conventional manipulation mechanism into a welding position. As nodal horn 12 is properly positioned for welding, sensing device 70, specifically engagable portion 86 of switch member 72, contacts the part to be welded. This contact can cause actuation of switch member 72, thereby resulting in output of a sensing signal to sensing controller 74. Sensing controller 74 can then determine appropriate operational properties for welding, such as the presence of the part to be welded and, in some embodiments, the proper orientation thereof. As discussed above, it should be appreciated that at least some portions of the enumerate operation may vary depending on the type of sensing device 70 that is used (i.e. contact switch versus non-contact switch).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A nodal sensing horn assembly for use in ultrasonic welding a first part to a second part, said nodal sensing horn assembly comprising:
    a nodal horn;
    a cavity formed within said nodal horn; and
    means for sensing the presence of the first part and outputting a sensing signal in response thereto, said means for sensing the presence of the first part being disposed at least partially within said cavity.

2. The nodal sensing horn assembly according to claim 1, wherein said means for sensing comprises:
    a switch member operable to detect the first part and output said sensing signal in response thereto; and
    a sensing controller receiving said sensing signal and determining a predetermined operational property for welding.

3. The nodal sensing horn assembly according to claim 2 wherein said predetermined operational property is the orientation of the first part.

4. The nodal sensing horn assembly according to claim 1 further comprising:
    a sleeve member operably disposed within said cavity of said nodal horn.

5. The nodal sensing horn assembly according to claim 4 wherein said cavity comprises a proximal portion, a distal portion, and a shoulder region extending therebetween; and
    said sleeve member comprises a proximal portion engageable with said proximal portion of said cavity to retain said sleeve member within nodal horn, said sleeve member further comprises a distal portion having an interior volume, said sensing device being at least partially disposed within said interior volume.

6. The nodal sensing horn assembly according to claim 1 wherein said means for sensing comprises:
    a switch member having an engageable portion, said engageable portion extending beyond a contact face of said nodal horn in an initial position and retracted within said cavity in a contact position.

7. The nodal sensing horn assembly according to claim 6, further comprising:
an adjustment device operable to adjust an amount said engageable portion extends beyond said contact face.

8. The nodal sensing horn assembly according to claim 1 wherein said means for sensing is a contact switch.

9. The nodal sensing horn assembly according to claim 1 wherein said means for sensing is a non-contact sensor.

10. The nodal sensing horn assembly according to claim 1 wherein said means for sensing is selected from the group consisting of mechanical switch or sensor, an inductive switch or sensor, a capacitive switch or sensor, a photoelectric switch or sensor, a magnetic switch or sensor, an acoustic switch or sensor, an electromagnetic switch or sensor, and combinations thereof.

11. The nodal sensing horn assembly according to claim 1 wherein said means for sensing is generally aligned with a longitudinal axis of said nodal horn.

12. A nodal sensing horn assembly for use in ultrasonic welding a first part to a second part, said nodal sensing horn assembly comprising:
a nodal horn having a contact face;
a cavity formed within said nodal horn; and
a switch member at least partially disposed within said cavity, said switch member having an engageable portion, said engageable portion extending beyond said contact face of said nodal horn in an initial position and retracted within said cavity in a contact position, said switch member outputting a sensing signal in at least one of said initial position and said contact position.

13. The nodal sensing horn assembly according to claim 12 wherein said switch member is generally aligned with a longitudinal axis of said nodal horn.

* * * * *